United States Patent [19]

Brill

[11] Patent Number: 4,532,553
[45] Date of Patent: Jul. 30, 1985

[54] CONTINUOUS DEPTH OF FOCUS CONTROL

[75] Inventor: Gerow D. Brill, Redwood City, Calif.

[73] Assignee: Ampex Corporation, Redwood City, Calif.

[21] Appl. No.: 703,443

[22] Filed: Feb. 19, 1985

Related U.S. Application Data

[63] Continuation of Ser. No. 364,719, Apr. 2, 1982, abandoned.

[51] Int. Cl.³ .............................................. H04N 5/26
[52] U.S. Cl. .................................... 358/228; 358/227
[58] Field of Search ............... 358/228, 227, 168, 162, 358/22

[56] References Cited

U.S. PATENT DOCUMENTS

| 4,268,866 | 5/1981 | Rodgers, III | 358/228 |
| 4,300,167 | 11/1981 | Miller | 358/228 |
| 4,301,478 | 11/1981 | Sakane | 358/227 |
| 4,365,272 | 12/1982 | Nagai | 358/228 |
| 4,396,951 | 8/1983 | Tanaka | 358/228 |

Primary Examiner—Tommy P. Chin
Attorney, Agent, or Firm—George B. Almeida; Joel D. Talcott

[57] ABSTRACT

In a television camera, the variable gain control is adjusted to provide a corresponding change in the camera output video signal level. The iris control simultaneously is changed to maintain the preset video signal level. This varies the iris setting and provides a corresponding change in the depth of focus to allow focussing on different objects in a scene.

3 Claims, 1 Drawing Figure

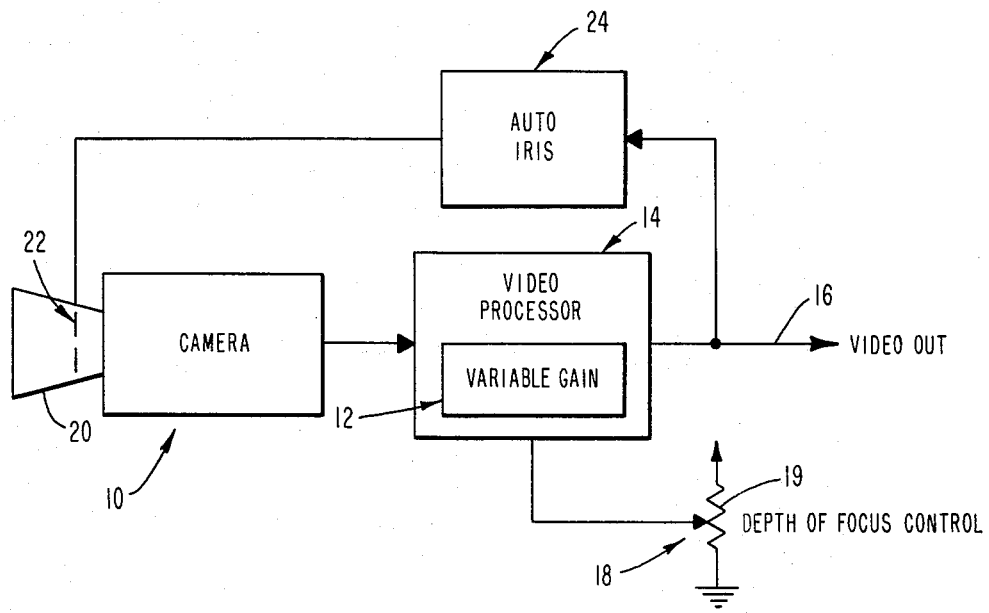

CONTINUOUS DEPTH OF FOCUS CONTROL

This application is a continuation of application Ser. No. 364,719, filed Apr. 2, 1982, now abandoned.

BACKGROUND AND SUMMARY OF THE INVENTION

The present invention relates to television cameras and in particular to the continuous depth of focus control of a television camera.

The generation and sales of video related advertising is a major industry within the field of television and one which generates millions of dollars for many companies whose products and services relate to the television and advertising industries. Thus, for example, suppliers of television recorders, cameras, switchers, editing systems, etc. are continually striving to provide new and better apparatus, techniques, aids, etc., for generating television advertising in the form of product commercials. Advertisers and television producers alike welcome any improvement in apparatus or techniques which decreases the time that it takes to produce a commercial, which simplifies the apparatus or procedure required to produce the commercial, or which enhances the dramatic affects of the commercial in its portrayal of a product to a viewer.

There are situations, particularly in television commercial production, when it is desirable to focus the viewer's attention on a person or product while under discussion. Thus, the person or product is kept in focus while the background, or a second object, is kept out of focus. At some point during the commercial presentation, it is desirable to bring the background or the second object into focus while maintaining the previously focussed person or product in focus.

Accordingly, the invention provides apparatus and method for controlling the depth of focus of a television camera as, for example, when generating television commercials in a studio environment. The scheme provides for focusing on a first object while keeping a second object or portion of the scene out of focus. To this end, in a television camera with automatic iris control, the variable gain of the camera is adjusted over a continuous range, which varies accordingly the video signal level. The auto iris control simultaneously detects the changing video signal level and, in keeping with its intended purpose, tries to maintain the preset video level. To do so, it changes over a continuous range the iris setting accordingly. The change of iris changes the depth of focus to bring into focus the second object. Thus, the depth of focus of the camera is varied over a continuous range by manipulating the variable gain control.

Accordingly it is an object of the invention to vary the depth of focus of a television camera by varying the gain of the camera.

It is another object to vary the depth of focus of a television camera via its automatic iris control, in response to a gain change.

It is a further object to perform a continuous change of depth of focus without changing lighting level or using special editing procedures.

BRIEF DESCRIPTION OF THE DRAWING

The single FIGURE is a block diagram depicting the combination of the invention.

DESCRIPTION OF THE PREFERRED EMBODIMENT

Referring to the single FIGURE, a television camera 10 supplies a conventional video signal to a variable gain control 12 which, in turn, forms part of the conventional video processing circuitry 14 of the camera system. The video processing circuitry 14 supplies a conventional output video signal on an output 16.

A depth of focus control 18 is formed of a potentiometer 19 coupled from ground to a given voltage. The focus control 18 is coupled to the variable gain means 12, and provides to the latter a range of DC voltages which, in turn, varies over a continuous range the gain of the video processing circuitry accordingly. As generally known, varying the gain of the video processing circuitry 14 varies in turn the output video signal level on output 16.

The camera 10 further includes a conventional lens 20 with an iris 22 which is adjustable over a continuous range. An automatic iris control 24 provides for adjusting the aperture of the iris 22 in response to the level of the video signal on the output 16.

By way of example only, a television camera system which includes an automatic iris control and a variable gain control such as depicted inter alia in the single FIGURE, is the BCC-20 broadcast color camera system manufactured by Ampex Corporation, Redwood City, Calif., and described in the Preliminary Information Manual issued September, 1981. Further description of the automatic iris control and the variable gain control are not required herein since such devices are generally conventional per se in the camera art.

By way of further explanation, a well known physical phenomenon of lenses is that they change their depth of focus with a corresponding change of the iris aperture. For example, the depth of focus may be as short as a few inches at f number 1.4, and may be several feet at f number 8.

In addition, in a television camera, increasing or decreasing the ambient light level being recorded by the camera causes a corresponding increase or decrease in the output video level. In sophisticated television cameras employing an automatic iris control, a change in the output video level is detected by the automatic iris control which adjusts the iris correspondingly, to return the output video level to the preset value automatically.

Accordingly, to provide a depth of focus change over a continuous range in accordance with the invention combination, the video signal gain is varied by varying the depth of focus control 18. The automatic iris control 24 detects the resulting variation in the output video level, and instructs the iris 22 to open or close accordingly. An increase in gain causes the iris to close, whereas a decrease in gain causes the iris to open. In turn, closing the iris 22 increases the depth of focus of the lens, and opening the iris decreases the depth of focus.

As previously mentioned by way of example, in television commercial production, the first object which the camera is focussed on may be a product under discussion wherein the background is kept out of focus. At some point in the commercial, it is desirable to include both the product and the background in focus. This is accomplished by adjusting the depth of focus control 18, to vary the gain accordingly via the variable gain control 12. This causes a change in the output video level on output 16 which, in turn, is detected by the automatic iris control 24. The latter control then varies the iris 22 accordingly which, in turn, changes the depth of focus to bring the background into focus along with the product.

For example, the product nearest the camera is in focus, with the background out of focus. When the background also is to be brought into focus, the depth of focus control 18 is adjusted to increase the gain. The increase in gain raises the output video level, which causes the automatic iris control 24 to close the iris 22. This in turn increases the depth of focus to also bring the background into focus.

In situations where the object which is furthest from the camera is in focus, with the foreground (or second object) out of focus, the adjustments are opposite. Thus, the gain is decreased to provide a decreased output video level which, in turn, opens the iris to decrease the focal length and bring the foreground (or second object), into focus.

Although the combination is described herein with respect to an automated control system, manual adjustments of a manual iris control along with the depth of focus control, are contemplated by the invention combination. Such depth of focus change may not be as smooth in transition as is provided by the automated system, but is still of practical use.

What is claimed is:

1. A method of changing the depth of focus of a television camera having an output video signal, an iris control and a variable gain control, comprising:
   setting an initial depth of focus commensurate with a related iris setting and an initial video signal level;
   purposely adjusting the gain control to provide a depth of focus control signal commensurate with a desired second depth of focus, which varies accordingly the video signal level;
   simultaneously varying the iris setting in response to the variation in the video signal level to maintain the initial video signal level; and
   varying the depth of focus in response to the variation in iris setting caused by the depth of focus control signal to provide a corresponding change in the desired second depth of focus while maintaining the initial video signal level.

2. The method of claim 1 further including:
   increasing the gain to increase the output video signal level, close the iris to maintain the initial video signal level and correspondingly provide an increased second depth of focus.

3. The method of claim 1 further including:
   decreasing the gain to decrease the output video signal level, open the iris to maintain the initial video signal level and correspondingly provide a decreased second depth of focus.

* * * * *